United States Patent [19]

Pryde et al.

[11] Patent Number: 5,716,096
[45] Date of Patent: Feb. 10, 1998

[54] DRAWSTRING SEAT COVER FOR ATTACHMENT TO A SEAT

[75] Inventors: Grant Pryde, Metamora; Don Bernhardt, Walled Lake; Patricia J. Tasny, Sterling Heights, all of Mich.

[73] Assignee: Lear Corporation, Southfield, Mich.

[21] Appl. No.: 595,420

[22] Filed: Feb. 5, 1996

Related U.S. Application Data

[63] Continuation of Ser. No. 124,946, Sep. 20, 1993, abandoned.

[51] Int. Cl.[6] .................................................. A47C 31/00
[52] U.S. Cl. ........................ 297/228.11; 297/228.1; 297/228.12
[58] Field of Search ..................... 297/228.11, 228.12, 297/224, 225, 219.1, 218.1, 228.13

[56] References Cited

U.S. PATENT DOCUMENTS

| | | | |
|---|---|---|---|
| Re. 33,586 | 5/1991 | Graff | 2/221 |
| 1,768,454 | 6/1930 | King | 297/228.11 |
| 2,161,448 | 6/1939 | Bishop | 155/182 |
| 2,191,848 | 2/1940 | Cramer et al. | 297/228.11 |
| 2,313,878 | 3/1943 | Kline | 297/228.12 X |
| 2,644,510 | 7/1953 | Benmax | 155/184 |
| 2,744,567 | 5/1956 | Larkin | 297/228.11 |
| 3,003,816 | 10/1961 | Wilson | 297/228.11 |
| 3,233,253 | 2/1966 | Cauvin | 5/353.1 |
| 3,586,370 | 6/1971 | Barecki | 297/228.11 |
| 3,630,572 | 12/1971 | Homier | 297/454 |
| 4,693,511 | 9/1987 | Seltzer et al. | 297/219 |
| 4,834,451 | 5/1989 | Meunier et al. | 297/218 |
| 4,865,383 | 9/1989 | Sbaragli et al. | 297/218 |
| 4,872,724 | 10/1989 | Deley et al. | 297/218 |
| 5,016,941 | 5/1991 | Yokota | 297/452 |
| 5,058,955 | 10/1991 | Sugiura et al. | 297/452 |
| 5,096,760 | 3/1992 | Thary | 428/71 |
| 5,150,947 | 9/1992 | Croshaw | 297/229 |

FOREIGN PATENT DOCUMENTS

| | | | |
|---|---|---|---|
| 163167 | 10/1933 | Switzerland | 297/228.11 |

*Primary Examiner*—Laurie K. Cranmer
*Attorney, Agent, or Firm*—Howard & Howard

[57] ABSTRACT

A seat cover assembly (10) includes a seat envelope (14) with a drawstring sheath (18) and a slidable drawstring (22) inside the sheath (18). The seat envelope (14) surrounds a seat (12), and front and rear attachment projections (38,40) on the seat (12) facilitate attachment of the seat envelope (14) to the seat (12). A webbing strip (48) joins the drawstring sheath (18) to the seat envelope (14) and a plurality of slits (24) are disposed in the webbing strip (48) and apart from the drawstring sheath (18) for attachment to the projections (38,40) on the seat (12).

3 Claims, 1 Drawing Sheet

U.S. Patent
Feb. 10, 1998
5,716,096
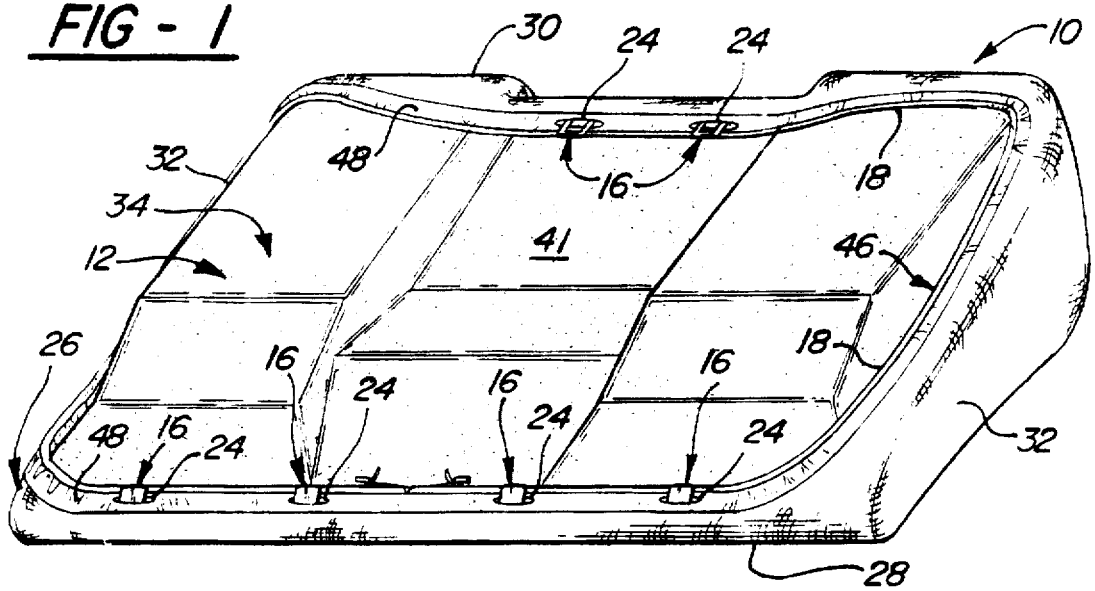
FIG - 1
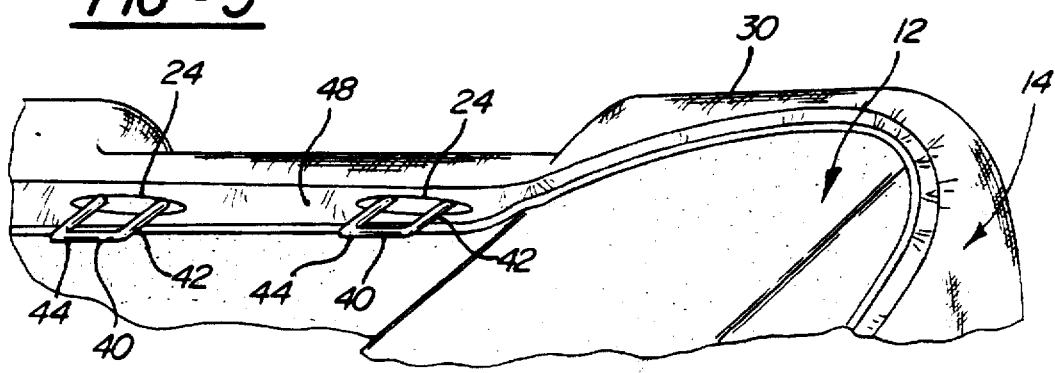
FIG - 2
FIG - 3

DRAWSTRING SEAT COVER FOR ATTACHMENT TO A SEAT

This is a continuation of Ser. 08/124,946 filed Sep. 20, 1993, abandoned.

TECHNICAL FIELD

The subject invention generally relates to a seat cover, particularly a seat cover including a drawstring, for securely covering a seat and providing easy attachment thereto and removal therefrom.

BACKGROUND ART

Upholstery seat covers used at the manufacturing level provide a seat manufacturer with a multitude of options for decoratively covering a seat. In addition, seat covers are commonly used by consumers as an inexpensive and easy way to hide damaged or unattractive seat upholstery and also provide added cushioning to the seat. For all uses, it is desirable to provide a seat cover that will securely remain in place on the seat and yet is easy to attach and remove from the seat.

It has long been known that a drawstring assembly in a seat cover can provide ease of attachment and removal for the seat cover. For example, U.S. Pat. No. 2,161,448 to Bishop illustrates a seat cover of this type. The Bishop '448 seat cover discloses a fabric panel with a drawstring sheath attached to the outer periphery thereof. A drawstring is slidably disposed within the sheath and, when cinched, pulls the fabric panel tightly against a seat. Thus, after tying the cinched drawstring, the seat cover can be retained against the seat.

However, with continued use, a drawstring-type seat cover as shown in Bishop '448 will slide and wrinkle unattractively with respect to the seat because it is not attached directly to the seat. On the other hand, seat cover designs that securely attach the seat cover to the seat can be very labor intensive and difficult to install. For example, U.S. Pat. No. 2,644,510 to Benmax illustrates a seat cover of this type. The seat cover includes a fabric panel designed to cover a seat bottom. A plurality of holes are disposed along the outer periphery of the fabric panel, and an identical number of hooks are located along an outer edge of the underside of the seat bottom. After the fabric panel is placed over the seat bottom, the holes are placed over the hooks to securely retain the fabric panel against the seat.

Thus the Benmax '510 seat cover will likely remain in place with respect to the seat without sliding and wrinkling. However, it is very difficult to install the seat cover due to the tension required in the fabric panel during installation. In other words, the fabric panel must be tightly held by an installer during attachment to the hooks in order to provide a tight fit of the seat cover after installation.

Further attempts to improve the drawstring-type seat cover have been made. For example, U.S. Pat. No. 5,150,947 to Croshaw illustrates an updated drawstring-type seat cover. The '947 seat cover includes a backrest cover and a seat bottom cover for covering, respectively, the backrest and seat bottom portions of a seat. The backrest cover and seat bottom cover are joined along a common seam, and a center panel is attached to the seam and extends through a crease between the backrest and seat bottom portions of the seat. The backrest cover and seat bottom cover each include a separate drawstring. After cinching, each drawstring is threaded through eyelets in the center panel and attached to hooks on the seat cover to retain the seat cover against the seat.

However, the Croshaw '947 seat cover still does not totally secure the seat cover in position against the seat to prevent wrinkling and sliding. Rather, the seat cover is free to move with respect to the seat and is not directly fixed thereto. In addition, the use of a center panel as in Croshaw '947 is inapplicable to a seat cover that covers only a seat bottom or only a backrest.

SUMMARY OF THE INVENTION AND ADVANTAGES

The present invention provides a seat cover assembly which can be easily attached and securely fastened to a seat. The seat cover includes a seat envelope and a drawstring sheath attached to the seat envelope including two ends. The drawstring sheath defines a continuous, enclosed chamber disposed between the ends and a drawstring is slidably disposed within the chamber of the drawstring sheath. The present invention is characterized by an attachment slit disposed in the seat envelope and apart from the drawstring sheath for engaging with a retaining device on the seat to hold the seat cover assembly against the seat while preventing sliding and wrinkling of the seat cover assembly.

The invention also contemplates a method for easily and securely attaching a drawstring seat envelope to a seat. The method includes enveloping the seat with the seat envelope and cinching a drawstring on the seat envelope to draw the seat envelope tightly against the seat. The method is characterized by placing an attachment slit in the seat envelope over a retaining device extending from the seat to securely retain the seat envelope against the seat and prevent sliding and wrinkling with respect to the seat.

The present invention permits simple attachment of a drawstring-type seat cover directly to a seat. By anchoring the seat cover to the seat at various points and then cinching the drawstring, the seat cover is fastened to the seat and prevented from relative motion with respect to the seat. The seat cover need not be placed in tension while joining the retaining device to the attachment slits because subsequent cinching of the drawstring will eliminate any remaining slack in the seat cover. Thus, the effort required for installation is minimal.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 a perspective view of the seat cover of the present invention disposed about a seat bottom as shown from the underside of the seat;

FIG. 2 is an enlarged fragmentary view of the drawstring ends and the slits in the seat cover before attachment to the seat bottom; and FIG. 3 is an enlarged fragmentary view of the rear edge of the seat cover attached to projections on the seat bottom.

DETAILED DESCRIPTION OF THE PREFERRED EMBODIMENT

The present invention comprises a seat cover assembly 10 for providing an easily attached and securely fastened seat cover for a seat. The seat cover assembly 10 includes a seat 12, a seat envelope 14 disposed about the seat 12, and retaining means 16 disposed on the seat 12 for retaining the seat envelope 14 against the seat 12. A drawstring sheath 18 is attached to the seat envelope 14 including two ends 20 and the drawstring sheath 18 defines a continuous, enclosed chamber between the ends 20. A drawstring 22 is slidably disposed within the chamber of the drawstring sheath 18. The invention is characterized by attachment slits 24 disposed in the seat envelope 14 and apart from the drawstring sheath 18 for engagement with a retaining device 16 on the seat 12 to securely retain the seat cover assembly 10 against the seat 12 while preventing sliding and wrinkling of the seat cover assembly 10.

As shown in FIG. 1, the seat 12 is a typical bench-type seat bottom for use in an automobile or other vehicle. However, the present invention is applicable to bucket seat bottoms or to backrests of any type as well. The seat 12 is shown inverted in FIG. 1 to better illustrate the attachment of the seat envelope 14 to the seat 12. The seat 12 includes an outer periphery 26 comprising a front edge 28, a rear edge 30, and two side edges 32. The seat 12 also includes a bottom surface 34 and a top surface (not shown). The seat 12 is formed of a foam material molded about a metal support frame (not shown).

The retaining means 16 on the seat 12 comprises a plurality of projections 38,40 integrally connected to the seat frame and extending outwardly from the bottom surface 34 of the seat 12. Front attachment projections 38 are disposed adjacent the outer periphery 26 of the seat 12 proximate the front edge 28 thereof. In addition, rear attachment projections 40 are disposed adjacent the outer periphery 26 of the seat 12 along the rear edge 30 thereof.

The attachment projections 38,40 comprise tabs or wires extending inwardly toward the center 41 of the bottom surface 34 of the seat 12. The tabs can be rectangular, semi-circular, or triangular metal projections. Similarly, the wires can be V-shaped, U-shaped, or C-shaped metal projections. In the preferred embodiment, the front attachment projections 38 comprise rectangular tabs as shown in FIG. 2 whereas the rear attachment projections 40 comprise U-shaped wires as shown in FIG. 3. The front and rear attachment projections 38,40 each include two side edges 42 and one bottom edge 44. The side edges 42 of the front and rear projections 38,40 are disposed generally perpendicular to the front and rear edges 28,30 of the outer periphery 26, respectively, while the bottom edges 44 are generally parallel to the front and rear edges 28,30.

The seat envelope 14 comprises a fabric enclosure or pouch that surrounds and envelops the seat 12. More specifically, the seat envelope 14 covers the top surface in addition to the front, rear, and side edges 28,30,32 (i.e. the outer periphery 26) of the seat 12. The seat envelope 14 includes a peripheral edge 46 which wraps around the outer periphery 26 of the seat 12 to partially cover the bottom surface 34 thereof.

The drawstring sheath 18 is fixedly attached to the peripheral edge 46 of the seat envelope 14 and is disposed along the entirety thereof. As best shown in FIG. 2, the drawstring sheath 18 includes first and second ends 20 and defines a continuous, uninterrupted, and enclosed chamber or tunnel for protecting and slidably guiding the drawstring 22. The seat envelope 14 includes a webbing strip 48 disposed along the peripheral edge thereof for joining the drawstring sheath 18 to the seat envelope 14. The webbing strip 48 comprises a narrow strip of strong, closely woven fabric such as nylon. The sheath 18 can be formed by merely folding over an edge portion of the webbing 48 and stitching the fold closed against the webbing 48. Alternatively, the drawstring 22 can be placed against the webbing 48 and a tunnel of stitching can be created to surround and envelop the drawstring 22. A third alternative involves sewing a discrete drawstring sheath 18 and to the webbing 48. The sheath 18 is preferably made of nylon although any material would be suitable that provides little resistance to sliding motion and yet remains durable.

The attachment slits 24 are disposed along the peripheral edge 46 of the seat envelope 14 and apart from the drawstring sheath 18. In other words, the slits 24 do not breach the sheath 18 but rather are outside the sheath 18. Upon placement of the seat cover 10 on the seat 12, the slits 24 will all be disposed against the bottom surface 34 of the seat 12 adjacent the outer periphery 26 thereof. In particular, the attachment slits 24 are disposed in the webbing 48 between the drawstring sheath 18 and the seat envelope 14. By placing the slits 24 in the webbing 48, the slits, 24 will be less likely to tear or rip due to the high relative strength of the webbing material. However it would also be conceivable to place the slits 24 within the seat envelope 14 at any desired location. The attachment slits 24 comprise cuts or wedges removed from the webbing material to provide an opening or eyelet through which a projection 38,40 may be inserted. The slits 24 are formed generally parallel to the peripheral edge 46 of the seat envelope 14 and thus are parallel to the outer periphery 26 of the seat 12 upon placement of the seat cover 10 on the seat 12. The attachment slits 24 may be reinforced with stitching or additional fabric around the edges thereof, although in the preferred embodiment the slits 24 are not reinforced.

As shown best in FIG. 2, the drawstring 22 includes first and second ends 50 extending respectively from the first and second ends 20 of the sheath 18. The drawstring ends 50 can be tied to posts 52 in the seat 12 after the drawstring 22 is cinched.

The seat envelope 14 is attached to the seat 12 in the following manner. First, the seat 12 is enveloped within the seat envelope 14 such that the seat envelope 14 covers the top surface (not shown) of the seat 12 and the front, rear, and side edges 28,30,32 thereof as shown in FIG. 1. Thus, the peripheral edge 46 of the seat envelope 14 as well as the drawstring sheath 18 attached thereto define an opening in the seat envelope 14 adjacent the bottom surface 34 of the seat 12 and proximate the outer periphery 26 of the seat 12.

Next, the attachment slits 24 are placed over the projections 38,40 to secure the seat envelope 14 against the seat 12. The ends 50 of the drawstring 22 are then extended from the ends 20 of the sheath 18 and are cinched in an overlapping fashion to draw the seat envelope 14 tightly against the seat 12. As the drawstring ends 50 are pulled, the effective length of the drawstring 22 within the sheath 18 is reduced. The sheath 18 must therefore constrict in response to the cinching to accommodate the decrease in length of the drawstring 22. Accordingly, the peripheral edge 46 of the seat envelope 14 along with the sheath 18 are pulled toward the center section 41 of the seat bottom 34 which thereby tightens the fit of the seat envelope 14 against the seat 12.

Upon cinching the drawstring 22, the attachment slits 24 are held in tension against the projections 38,40 to prevent the seat cover 10 from moving with respect to the seat 12. The drawstring ends 50 can be then tied to posts 52 or other projections on the seat 12 to maintain tension in the cinched drawstring 22. It is also conceivable that hooks, loops, or the like could be placed on the drawstring ends 50 to facilitate securing of the drawstring 22 to the posts 52 after cinching.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A seat cover assembly for providing an easily attachable and securely fastened seat cover for a seat, said seat assembly including:

a seat portion having oppositely facing, parallel and spaced apart front and rear edges interconnected by a pair of side edges;

a seat envelope of a first material disposed about said seat portion and including a peripheral edge wrapped around each of said front, rear and side edges;

a webbing strip of a second material different from said first material and joined along said peripheral edge of said seat envelope;

a drawstring sheath attached to said webbing strip and spaced from said peripheral edge of said seat envelope, said sheath defining a continuous enclosed chamber extending between two ends for slidably guiding a drawstring therethrough;

a plurality of first projections fixedly secured along said front edge and extending upwardly and inwardly in a direction away from said adjacent front edge and toward said opposing rear edge;

a plurality of second projections fixedly secured along said rear edge and extending upwardly and inwardly in a direction away from said adjacent rear edge and toward said opposing front edge; and a plurality of attachment slits disposed in said webbing strip along said front and rear edges and spaced between said peripheral edge of said seat envelope and said drawstring sheath for receiving and engaging said first and second projections along said respective front and rear edges to securely retain said seat envelope around said opposing front and rear edges against, the opposing force of the drawstring being cinched in tension between said ends of said drawstring sheath.

2. An assembly as set forth in claim 1, wherein said projections engage said slits to retain said seat envelope around said front and rear edges independent of said drawstring being cinched in tension to tighten said seat cover envelope about said front, rear and side edges.

3. An assembly as set forth in claim 2, further including said attachment slits being disposed parallel to said peripheral of said seat envelope along each of said front and rear edges.

* * * * *